Figure 4:
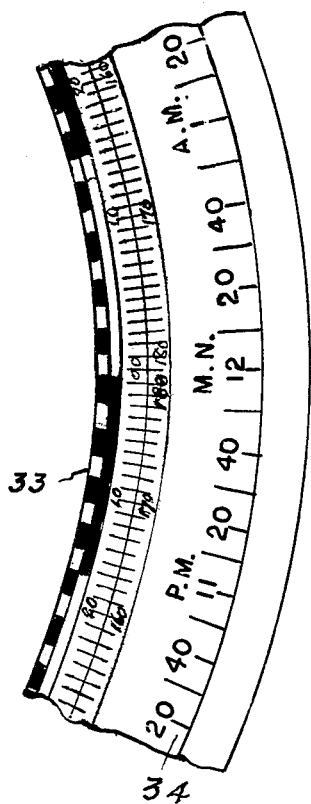

Sept. 11, 1962　　　　K. M. OLSON　　　　3,052,993
GLOBE WITH SATELLITE-ORBIT DEMONSTRATOR
Filed Oct. 16, 1959　　　　　　　　　　2 Sheets-Sheet 1
FIG. 1
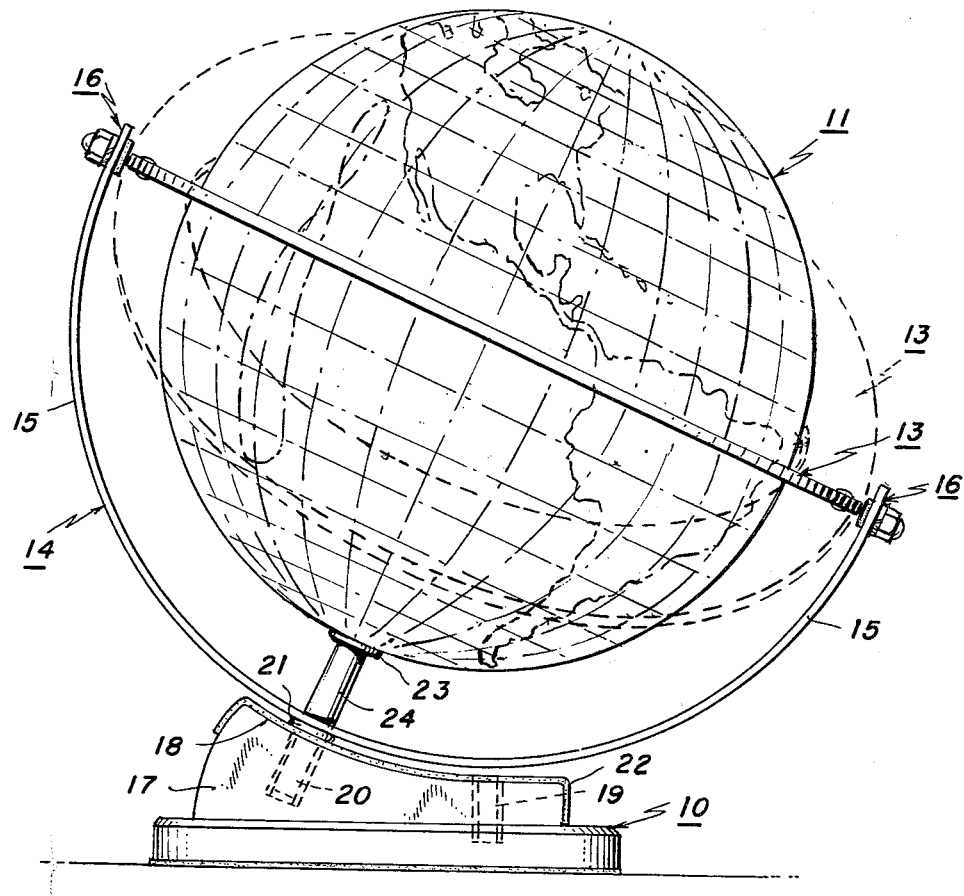
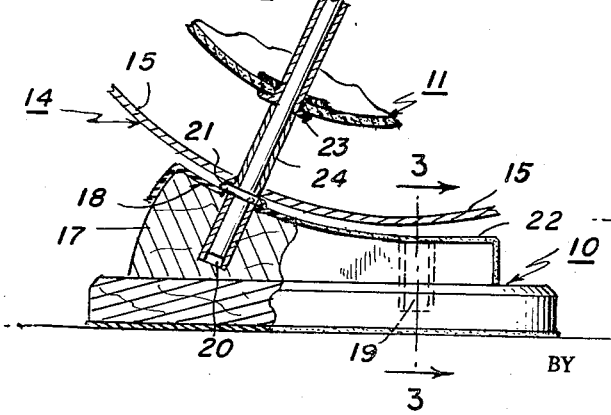
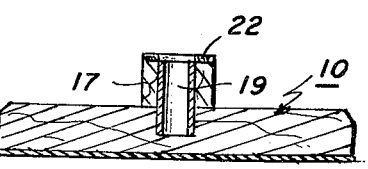
INVENTOR
KEITH M. OLSON
BY
ATTORNEY Sept. 11, 1962  K. M. OLSON  3,052,993
GLOBE WITH SATELLITE-ORBIT DEMONSTRATOR
Filed Oct. 16, 1959  2 Sheets-Sheet 2

INVENTOR
KEITH M. OLSON

BY *H. B. Willson & Co.*
ATTORNEY

United States Patent Office 3,052,993
Patented Sept. 11, 1962

3,052,993
GLOBE WITH SATELLITE-ORBIT
DEMONSTRATOR
Keith M. Olson, Wilmette, Ill., assignor to Denoyer-Geppert Company, Chicago, Ill.
Filed Oct. 16, 1959, Ser. No. 846,935
6 Claims. (Cl. 35—46)

This invention relates to teaching globes and more particularly to a globe mounting device which may be used for the demonstration of the apparent orbits around a terrestrial globe of various earth satellites that are launched by man, as well as for demonstrating basic earth-sun relationships. The globe with its mounting is an educational teaching tool useful in teaching geography, physics, navigation, earth science and related subjects.

One object of the invention is to provide a simple but representative means for showing the static orbit of an earth satellite in any position as a great circle or great ellipse around the earth, such means including a horizon ring mounted independently of the globe to have both a free 360° rotary movement around the globe and a swinging movement about the globe from pole to pole; but the device is also useful for demonstrating basic earth-sun relationships which relate to earth-satellite study.

In the study and observation of earth-satellites, an understanding of latitude (parallel), longitude (meridian), rotation (polar axis), revolution (ecliptic), time, distance, speed, orbit, great circles, direction, circle of illumination (daylight circle), zenith, hemisphere, seasons (climate), the analemma, the tropics of cancer and capricorn (the solstices), arctic and antarctic circles, and related topics is considered essential. This new globe mounitng makes it possible to teach these topics individually and collectively because they are inter-related and essential to the fields of mathematical geography, navigation, and earth-satellites.

While many globe mountings have been proposed to show some, or make it possible to teach some, of the above topics, applicant's new globe mounting and globe makes it possible, in one device, to demonstrate and teach in a classroom all of the above topics.

The invention contemplates a suitable base or stand which preferably supports the lower end of an axis pin for rotary movement, a world globe mounted at its South Pole for free rotation on the upper portion or end of the pin, an orbit-demonstrating ring, preferably in the form of a median plane horizon ring, which surrounds the globe in closely spaced relation thereto, and a suitable ring-supporting member preferably fixed to an intermediate portion of the axis pin and having portions or arms between which the ring is pivoted on an axis perpendicular to the polar axis of the globe for swinging movement from one side of the intermediate portion of the pin to the opposite side thereof, that is, from 0° to 180° and 180° to 0° so that the axis of the horizon ring is in the plane of the equator.

Another object of the invention is to provide a globe mounting in which the horizon ring is attached preferably to an 180° arcuate member at its outer edges in such manner that it can swing on an axis that would be parallel to the equator or perpendicular to the polar axis when the globe is in position on the mounting.

Another object is to provide a globe mounting of the above indicated character in which a standard world globe may be used.

With the above and other objects and advantages in view, the invention resides in the novel combinations and arrangements of parts and the novel features of construction hereinafter described and claimed, and illustrated n the accompanying drawings which show the present preferred embodiment of the invention.

Figure 5:
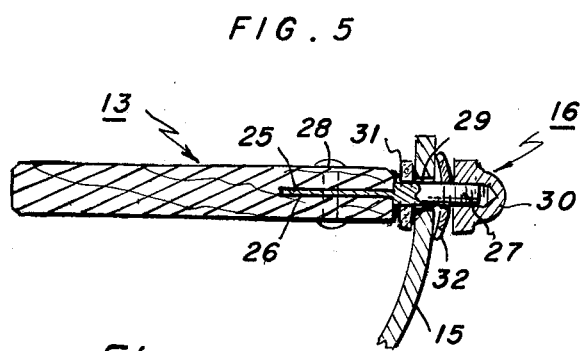
Figure 6:
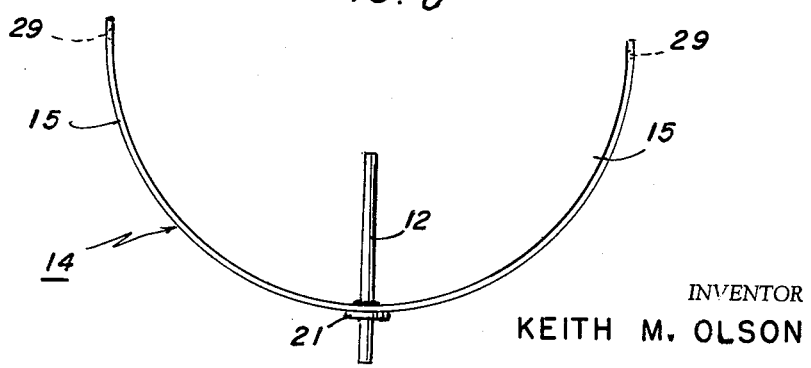

In the drawings:
FIG. 1 is a side view of the improved globe mounting showing the horizon ring in full lines disposed over the equator and in dotted lines in a tilted position;
FIG. 2 is a detail vertical section showing the axis pin and its association with the base and the globe;
FIG. 3 is a detail section through the base on the line 3—3 in FIG. 2;
FIG. 4 is a detail side view of a portion of the horizon ring;
FIG. 5 is a detail sectional view on an enlarged scale, showing the pivotal mounting of the horizon ring; and
FIG. 6 is a side elevation on a reduced scale of the arcuate ring-mounting member and the axis pin.

Referring more in detail to the drawings, the numeral 10 denotes any suitable stand or base, 11 a terrestrial globe, 12 an axis pin carried by the base and on which the globe is mounted for rotation, 13 a median plane ring surrounding and spaced from the globe, 14 a ring-mounting member mounted for rotation about the globe axis and having portions or arms 15 disposed at diametrically opposite points of the ring, and 16 pivoting means between the arms and diametrically opposite portions of the ring. The ring-carrying member 14 is preferably a metal bar bent to an arc of 180° and has its central portion brazed or otherwise fixed to an intermediate portion of the axis pin 12; and the latter is preferably mounted for rotation on the base 10. As shown, the base has a flat lower portion of any suitable size and shape and on its top is a straight upstanding rib 17 with a curved upper edge 18 that is substantially concentric with the globe or the arcuate member 14. In that edge 18 are two longitudinally spaced bearing sockets 19 and 20 in either of which the cylindrical lower end of the pin 12 may be rotatably and removably positioned. The socket 19 is disposed vertically while the socket 20 is inclined at an angle of 23½° from the vertical so that the globe may be supported with its polar axis disposed vertically or at the angle of rotation of the earth. To limit the insertion of the axis pin in a socket an annular shoulder or collar 21 is fixed to the pin below the member 14; and if desired, the curved upper face of the rib 17 may be covered with felt or other cushioning material 22. When the base is made of wood the sockets or bearing holes 19 and 20 are lined with metal tubes or bushings, as will be understood on reference to FIGS. 2 and 3.

It will be noted that by reason of the rotation of the member 14 about the polar axis of the globe and the swinging movement of the horizon ring 13 on the member on an axis perpendicular to the globe axis and opposite the equator, the horizon ring has substantially universal movement about the globe so that it will always be in a great circle position. That makes it possible for the horizon ring to represent the apparent orbit of earth satellites in whatever ellipse they happen to travel, and at the same time the globe can be freely rotated on its axis to show that the path of the orbit across a given point on the earth may be two different angles depending upon the latitude of the point with respect to the plane of the orbit. Further such mounting and universal movement of the horizon ring with its usual scales makes it possible to measure latitude and longitude (at the equator) in degrees with the globe in its position inclined 23½° from the vertical. It will also be noted that the ring mounting means is supported solely from the globe mounting means and forms a gimbal joint that permits substantially universal tilting movement of the ring about the spherical globe.

The world globe 11 may be of any suitable construction but as shown at its South Pole is a cylindrical bearing or socket 23 to receive the upper end of the axis pin 12. The portion of the pin above the member 14 is of cylindrical shape and surrounding that portion between the member 14 and the globe socket 23 is a cylindrical sleeve 24 that supports the weight of the globe and holds it properly spaced from the interior of the ring 13.

While the satellite-orbit indicating ring 13 may be of various forms, it is preferably a median plane horizon ring with various scales on one or both its flat faces. It may be made of plywood, metal or plastic material such as synthetic resin. When made of wood, the pivotal mountings 16 are preferably constructed as shown in FIG. 5. At diametrically opposite points on the ring, sockets 25 are formed in its outer edge to receive metal plates 26 carrying outwardly projecting pivot studs 27, the plates being fastened by rivets or other fastenings 28. These diametrically opposite pivot studs are rotatable in bearing openings 29 formed in the arms 15. The pivots have screw threaded ends to receive clamping nuts 30 which engage the outer faces of the arms, and to frictionally hold the ring 13 in any position to which it is swung, leather washers 31 are placed on the studs on one side of the arm 15 and spring washers 32 are on the other sides of the arms, as shown in FIG. 5. The pivots are positioned on the horizon ring at 0° to 180° and 180° to 0° so that the axis of the horizon ring is in the plane of the equator. It will be noted that the flat horizon ring is always disposed in the same plane as a great circle which bisects the globe so that it forms an extension of that plane beyond the surface of the globe, and that the pivot studs 27 project outwardly from the outer edge of the ring while its inner edge is only slightly spaced from the surface of the globe.

The 360° horizon ring may have the graduations of various scales as above noted, but as shown in FIG. 4, it has on one of its flat faces a scale 33 for statute miles in 100 mile and 1,000 mile intervals, and a scale 34 representing time with 10 minute and 1 hour intervals.

It will be noted that the horizon ring is attached to the 180° arcuate member 14 in such manner that it can swing on an axis that would be parallel to the equator and perpendicular to the polar axis when the globe is in the mounting device. Since the member 14 is fixed to the intermediate portion of the rotatable axis pin, the member can rotate in either direction about the globe on the axis of the latter so that the pivots 27 move in a circle concentric with the equator of the globe. The horizon ring can be swung from one side of the axis pin to the other side thereof, and the horizon ring is always in a great circle position which makes it possible to represent the apparent orbit of artificial satellites in whatever ellipse they may happen to travel. At the same time the globe can be rotated on its axis to show that the path of the orbit across a given point on the earth may be two different angles, depending on the latitude of the point with respect to the plane of the orbit. With this device, the base can remain stationary in the sense that it is not necessary to tip the base or the entire unit for students in the classroom to observe. The globe maintains polar inclination of 23½° from the vertical, the standard angular position for terrestrial globes, when the pin 12 is in the socket 20. With this improved mounting of the terrestrial globe it is possible to measure latitude (along any meridian) and longitude (at the equator) in degrees with the globe maintaining its same position inclined 23½° from the vertical, using the same horizon ring.

It will be apparent that with this device earth-sun relationships can be adequately demonstrated including the following topics: latitude and longitude, time, distance, daylight and darkness, hemispheres, equinox and solstice, the analemma, the solar and sidereal time, hour circles, and international date line; and at the same time the device serves as an effective means for showing the static orbit of an earth satellite in any position as a great circle or great ellipse around the earth. The following are a few of many uses of the device:

(A) How to find the apparent orbit of an earth satellite. Most satellites are launched in an easterly direction and the apparent orbit of every satellite is a great ellipse since it cannot orbit except by the forces of speed and gravity, although the genius of some of the American satellites is the nearly perfect circle formed by some of them. If the horizon ring is set so that it crosses the equator at 45 degrees and the 6 p.m. midpoint is 45 degrees north on one side and 45 degrees south on the other side, and the earth globe is slowly rotated from west to east (orbit of satellite remains in the same plane with itself), it will be seen that Washington, D.C. will pass under the plane of the orbit in two places. The apparent direction of the orbit from Washington, D.C. at these two intersections are at two angles, the sum of which equals 180°. Distance from the earth at perigree, apogee and intermediate distance can be indicated by using the horizon ring scale for miles or by using the plastic measuring tape scale. The mileage scale on the horizon ring is in the same scale as the 12" globe. Thus if it is known that a satellite is orbiting between 200 and 1500 miles this distance can be stepped off for both perigee and apogee. Simply count off 200 miles on the horizon ring and this would represent perigee, and 1500 miles would represent apogee. Then a paper pattern in eliptical or egg-shaped form can be cut out with a 12" diameter hole so that it would fit around the 12" globe. These distances would vary for each satellite and a different scale would be required for each one but if a 12" globe is used such is not the case. The pattern would be different but the scale in miles would be the same.

(B) How to find the latitude and longitude of a specified place in the Northern Hemisphere. Consider Moscow, U.S.S.R. Set the globe in a perpendicular position. Move the horizon ring in a vertical position so that it cuts Moscow. Notice that the ring bisects the poles. Read the latitude of Moscow on the vertical horizon (approximately 56° North latitude). Read the longitude of Moscow from the scale degrees on the globe (approximately 37° East of prime meridian). By placing the horizon ring in the vertical position, latitude can either be read directly on the globe lying between 50 degrees North and 60 degrees North or by placing Moscow directly under the horizon ring the latitude can be read directly from the degrees scale on the ring. The advantage is that while the parallels of latitude run horizontally around the earth, they measure distance in degrees north and south of the equator.

(C) How to find the great-circle route and great-circle distance and direction traveled between any two places. Consider the distance between Moscow and New York, N.Y. Adjust the horizon ring on the globe so that the scale extends between Moscow and New York. This will involve the rotation of the globe. Read the scale—1,000 statute miles for each block (approximately 4,600 miles). Use the plastic measuring scale—distances in thousands of statute miles—between the two centers. This technique checks answer. The horizon ring and the plastic scale extend across the North Atlantic in an almost North-Northeast direction to Reykjavik, Iceland. It extends east and east-south-east across the Norwegian Sea to Norway and Sweden, and then in an almost southeasterly direction across the Gulf of Bothnia to Moscow.

(D) How to find the altitude of the noon sun for any given location at any time of the year. Consider Moscow, U.S.S.R. What is the altitude of the noon sun on February 15. Set the globe in a perpendicular position. Refer to the analemma. Note that on February 15 the vertical rays of the sun are at latitude 12° South. Place the horizon ring in a vertical position so that it bisects Moscow (56° North latitude). Measure the distance in degrees between Moscow and 12° South (68° equals the zenith distance of the noon sun). Subtract from 90° the zenith distance of the noon sun and the result is the altitude of the noon sun (22° above the southern horizon).

From the foregoing, taken in connection with the accompanying drawing, it will be seen that novel and advantageous provision has been made for carrying out the objects of the invention, and while preferences have been disclosed, attention is invited to the possibility of making variations within the scope of the invention as claimed.

I claim:

1. A device of the character set forth comprising in combination a support, a terrestrial globe, means on said support mounting said globe for free rotation about its polar axis, a flat horizon ring encircling said globe with its inner edge closely spaced from the surface of the globe, gimbal-joint means mounting said ring from said support for substantially universal movemnent about said globe, said gimbal-joint means comprising a ring-supporting member having spaced portions disposed at diametrically opposite points of the outer edge of said ring means mounting member on said support for free rotation about the pivotal axis of said globe when the globe is stationary, and alined pivotal connections between said opposed portions of the member and the outer edge of said ring, whereby said pivotal connections will always be disposed in the plane of the equator of the globe as said member rotates about the globe while the latter is stationary and as said ring tilts from pole to pole on said pivotal connections.

2. The device of claim 1 together with friction creating means associated with at least one of said pivotal connections, whereby said ring will be frictionally held in any position to which it may be tilted, while said globe is free to rotate on its axis.

3. A globe and satellite orbit demonstrator comprising in combination a support, a terrestrial globe, means on said support mounting said globe for free rotation about its polar axis, a full circle ring encircling said globe, and gimbal-joint means between said support and said ring mounting said ring for substantially universal movement about the globe, said gimbal-joint means comprising a ring-supporting member having spaced portions disposed at diametrically opposite sides of said ring, means carried by said support for mounting said member for free rotation about the axis of said globe when the globe is stationary, and alined pivotal connections between said spaced portion of the member and the said opposite sides of said ring, whereby said pivotal connections will always be in the plane of the equator of the globe as said member rotates about the globe while the latter is stationary, and as said ring tilts from pole to pole of the globe on said pivotal connections.

4. A device of the character set forth, having a support and a terrestrial globe mounted thereon for free rotation about its polar axis, a median plane ring encircling said globe with its inner edge closely spaced from the surface of the globe, said ring being flat and having scale graduations on at least one of its flat faces, and gimbal-joint means mounting said ring for substantially universal movement about said globe, said means comprising a ring-supporting member mounted for rotation about the axis of said globe and having spaced arm portions disposed at diametrically opposite points of the outer edge of said ring and alined pivotal connections between said arm portions and the outer edge of said ring, whereby said pivotal connections will always be disposed in the plane of the equator of the globe as said member rotates about the globe and said ring tilts from pole to pole of said globe on said pivotal connections, the said support having a base with an upwardly open cylindrical bearing socket and the rotary mounting of said globe including a polar axis pin having its lower cylindrical end rotatable in said socket, said globe being independently rotatable on an upper portion of said pin, and said member being fixed to an intermediate portion of said axis pin to permit the rotation of the member about the globe axis.

5. The device of claim 4 in which said globe has on at least one of its poles a cylindrical bearing sleeve to receive an upper cylindrical end portion of said axis pin, and a globe supporting and spacing sleeve on the intermediate portion of said axis pin between said member and said sleeve in the globe.

6. A device of the character set forth, having a support and a terrestrial globe mounted thereon for free rotation about its polar axis, a median plane ring encircling said globe with its inner edge closely spaced from the surface of the globe, said ring being flat and having scale graduations on at least one of its flat faces, and gimbal-joint means mounting said ring for substantially universal movement about said globe, said means comprising a ring-supporting member mounted for rotation about the axis of said globe and having spaced arm portions disposed at diametrically opposite points of the outer edge of said ring and alined pivotal connections between said arm portions and the outer edge of said ring, whereby said pivotal connections will always be disposed in the plane of the equator of the globe as said member rotates about the globe and said ring tilts from pole to pole of said globe on said pivotal connections, the said support having a flat base with a straight upwardly projecting rib having its upper edge longitudinally curved on an arc concentric with the globe, said upper edge having two longitudinally spaced cylindrical bearing sockets, one of said sockets being perpendicular and the other disposed at an inclination of 23½°, the rotary mounting of said globe including a cylindrical axis pin adapted to have its lower end rotatably supported in either of said sockets, and its upper end portion inserted in a cylindrical bearing sleeve on at least one of the poles of said globe to permit free rotation of the latter, said ring-supporting member is a 180° arcuate bar fixed at its center to an intermediate portion of said axis pin, the ends of said arcuate bar forming said arm portions, and a globe supporting and spacing sleeve on an intermediate portion of said axis pin between said arcuate bar and said sleeve in the globe.

References Cited in the file of this patent

UNITED STATES PATENTS

| | | |
|---|---|---|
| 313,752 | Montgomery | Mar. 10, 1885 |
| 320,999 | Berneike | June 30, 1885 |
| 477,846 | Rassweiler | June 28, 1892 |
| 1,849,202 | Pfluger | Mar. 15, 1932 |
| 2,279,162 | Dupler | Apr. 7, 1942 |
| 2,374,788 | Steele | May 1, 1945 |

FOREIGN PATENTS

| | | |
|---|---|---|
| 592,705 | Germany | Feb. 14, 1934 |